(12) United States Patent
Fujita et al.

(10) Patent No.: US 10,766,432 B2
(45) Date of Patent: Sep. 8, 2020

(54) DOOR TRIM

(71) Applicant: Toyota Jidosha Kabushiki Kaisha, Toyota-shi, Aichi-ken (JP)

(72) Inventors: Masahiro Fujita, Nagoya (JP); Manabu Ohtsuka, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 156 days.

(21) Appl. No.: 16/043,473

(22) Filed: Jul. 24, 2018

(65) Prior Publication Data
US 2019/0061644 A1 Feb. 28, 2019

(30) Foreign Application Priority Data

Aug. 23, 2017 (JP) ................. 2017-159921

(51) Int. Cl.
*B60R 13/02* (2006.01)
*B60R 13/00* (2006.01)

(52) U.S. Cl.
CPC ........ *B60R 13/0206* (2013.01); *B60R 13/005* (2013.01); *B60R 13/0243* (2013.01); *B60R 2013/0287* (2013.01)

(58) Field of Classification Search
CPC ............ B60R 13/0243; B60R 13/0206; B60R 13/005; B60R 2013/0287
USPC ...................................... 296/146.7
See application file for complete search history.

(56) References Cited

U.S. PATENT DOCUMENTS 8,584,325 B2 * 11/2013 Onuma ............... B60R 13/0206
24/289

FOREIGN PATENT DOCUMENTS

| JP | 2015-089749 A | | 5/2015 |
| JP | 2015089749 A | * | 5/2015 |

* cited by examiner

*Primary Examiner* — Joseph D. Pape
*Assistant Examiner* — Dana D Ivey
(74) *Attorney, Agent, or Firm* — Dinsmore & Shohl LLP

(57) ABSTRACT

A door trim includes a door trim base that has a fitting hole, and an ornament. The ornament has a fitting lug, and is configured to be attached to the door trim base with the fitting lug fitted into the fitting hole. The ornament includes an ornament base in which the fitting lug is provided and a high-brittleness portion that is fixed to the ornament base and of which at least a portion is more brittle than the ornament base and the door trim base and the ornament are connected to each other by a strap that has an excess length when the fitting lug is fitted into the fitting hole.

7 Claims, 6 Drawing Sheets

DOOR TRIM

CROSS-REFERENCE TO RELATED APPLICATIONS

This application claims priority to Japanese Patent Application No. 2017-159921 filed on Aug. 23, 2017, which is incorporated herein by reference in its entirety including the specification, drawings and abstract.

BACKGROUND

1. Technical Field

The disclosure relates to a door trim for a vehicle, particularly to a door trim to which an ornament is attached.

2. Description of Related Art

Japanese Unexamined Patent Application Publication No. 2015-089749 (JP 2015-089749 A) discloses a technique in which a door trim base is provided with a fitting hole, an ornament is provided with a fitting lug, and the fitting lug is fitted into the fitting hole such that the ornament is attached to the door trim base.

However, the technique in JP 2015-089749 A has the following problem. In the case of an ornament of which a surface is decorated with a high-brittleness portion formed of highly brittle material, such as glass, there is a possibility that the ornament falls with a fitting lug falling off a fitting hole and the high-brittleness portion of the ornament is damaged.

SUMMARY

The disclosure provides a door trim with which it is possible to suppress damage to an ornament.

An aspect of the disclosure relates to a door trim including a door trim base and an ornament. The door trim base has a fitting hole. The ornament has a fitting lug, the ornament being configured to be attached to the door trim base with the fitting lug fitted into the fitting hole. The ornament includes an ornament base in which the fitting lug is provided and a high-brittleness portion that is fixed to the ornament base and of which at least a portion is more brittle than the ornament base. The door trim base and the ornament are connected to each other by a strap that has an excess length when the fitting lug is fitted into the fitting hole.

In the door trim according to the aspect of the disclosure, the door trim base may be provided with a first hook-and-loop fastener portion and the ornament may be provided with a second hook-and-loop fastener portion to be bonded to the first hook-and-loop fastener portion.

In the door trim according to the aspect of the disclosure, the at least portion of the high-brittleness portion may be formed of at least one of glass or stone.

In the door trim according to the aspect of the disclosure, the strap may be attached to the ornament base of the ornament.

In the case of the door trim according to the aspect of the disclosure, since the door trim base and the ornament are connected to each other by the strap having the excess length, the ornament cannot move relative to the door trim base by a distance exceeding a distance corresponding to the excess length of the strap even when the fitting lug falls off the fitting hole. Therefore, the high-brittleness portion of the ornament can be restrained from being damaged due to falling of the ornament.

Furthermore, in the case of the door trim according to the aspect of the disclosure, since the door trim base is provided with the first hook-and-loop fastener portion and the ornament is provided with the second hook-and-loop fastener portion bonded to the first hook-and-loop fastener portion, vibration of the ornament that is generated at a time when the door is normally closed (including when door is strongly closed) or the like can be absorbed by the first hook-and-loop fastener portion and the second hook-and-loop fastener portion and the ornament can be restrained from being falling off the door trim base.

In the case of the door trim according to the aspect of the disclosure, since the high-brittleness portion is formed of at least one of glass or stone, it is possible to achieve a classy door trim design.

In the case of the door trim according to the aspect of the disclosure, since the strap is attached to the ornament base of the ornament, unlike a case where the strap is attached to the high-brittleness portion of the ornament, the tension of the strap can be restrained from being applied to the high-brittleness portion and the high-brittleness portion can be restrained from being damaged.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
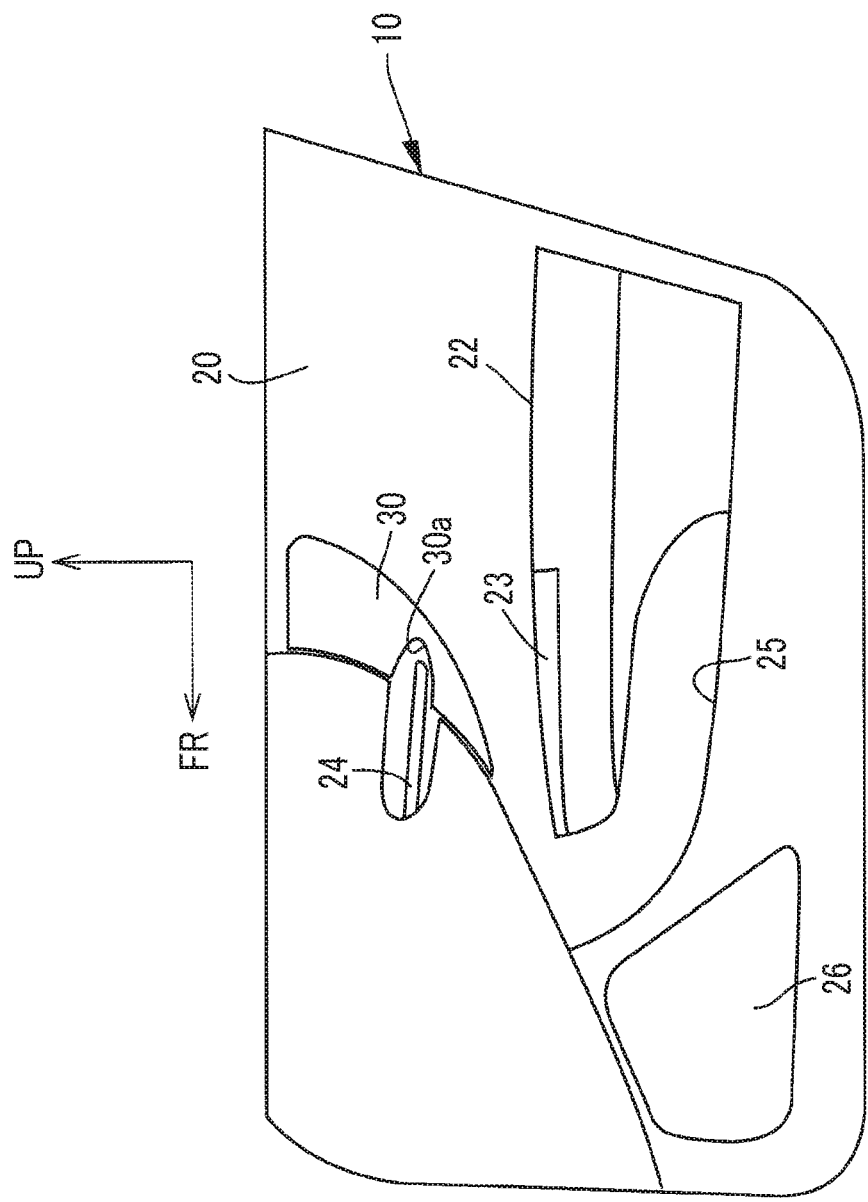
FIG. 1 is a schematic front view of a door trim according to an embodiment of the disclosure.

Hereinafter, a door trim 10 according to an embodiment of the disclosure will be described with reference to the drawings. In the drawings, "UP" represents an upper side, "FR" represents a front side in a vehicle front-rear direction, and "OUT" represents an outer side in a vehicle width direction. Hereinafter, unless otherwise noted, a height direction and a front-rear direction respectively refer to a vehicle height direction and the vehicle front-rear direction.

As illustrated in FIG. 1, the door trim 10 is mounted on a door that is mounted on a right side or a left side of a vehicle. The door may be a door for a vehicle front seat occupant and may be a door for a vehicle back seat occupant. A surface (outer surface in vehicle width direction) of the door trim 10 that is on an opposite side of a vehicle cabin side faces a metal door panel (not shown) and the door trim 10 is attached to the door panel.

Figure 3:
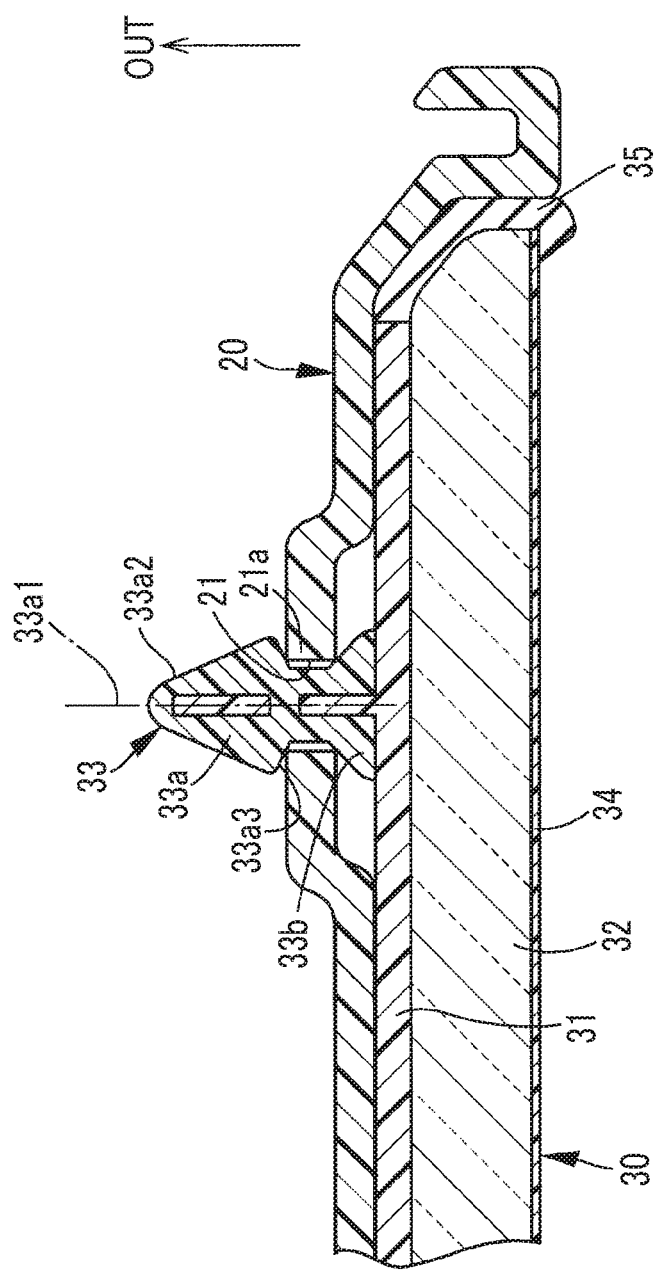
FIG. 3 is a partially enlarged sectional view illustrating a fitting lug of the door trim according to the embodiment of the disclosure and the vicinity of the fitting lug.
Figure 4:
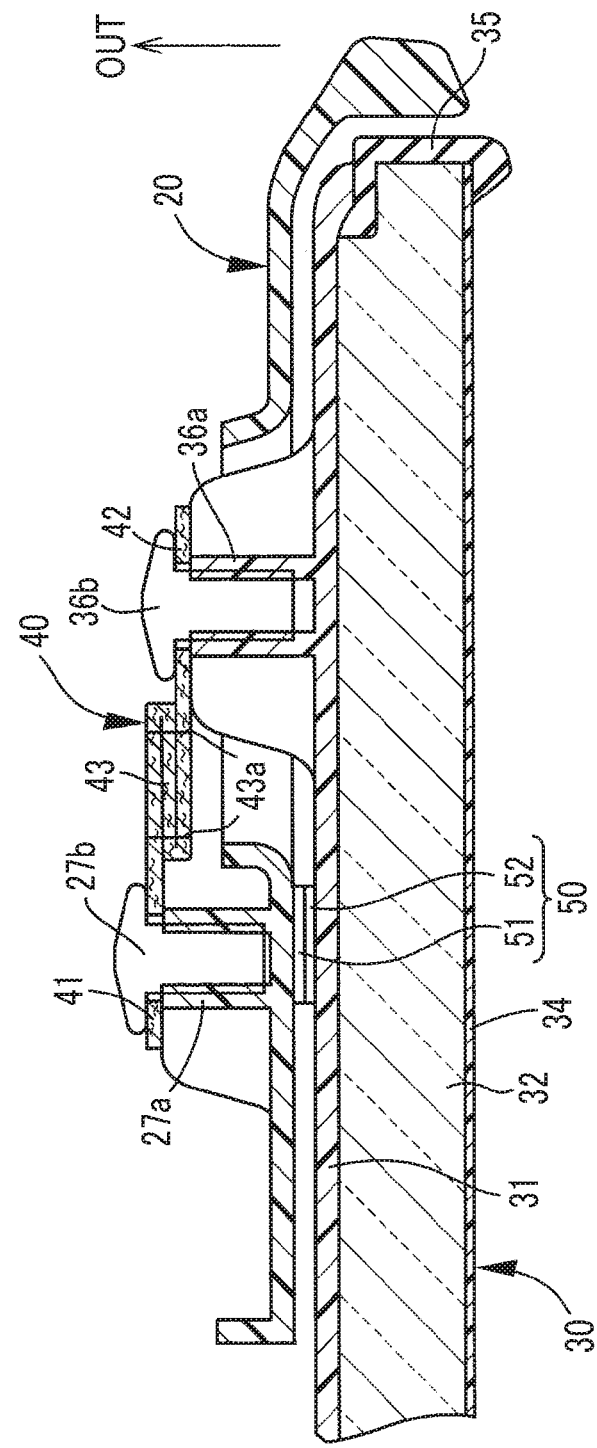
FIG. 4 is a partially enlarged sectional view illustrating the strap in a state where a fitting state between the fitting lug and a fitting hole of the door trim according to the embodiment of the disclosure is maintained and the vicinity of the strap.

As illustrated in FIG. 3, the door trim 10 is provided with a door trim base 20 and an ornament 30. The door trim base 20 is provided with fitting holes (may also be referred to as fitting receiving portion) 21, and the ornament 30 is provided with fitting lugs 33 and is attached to the door trim base 20 with the fitting lugs 33 fitted into the fitting holes 21. As illustrated in FIG. 4, the door trim 10 is provided with a strap 40.

The door trim base 20 is made of resin. The door trim base 20 may have a single-component configuration or a multi-component configuration. When the door trim base 20 is attached to the door panel (not shown), the door trim 10 is attached to the door panel. As illustrated in FIG. 1, on the door trim base 20, an armrest 22 on which a vehicle cabin occupant rests an elbow is provided to extend in the front-rear direction. A switch disposition portion 23 on which switches (not shown) such as a power window switch are disposed is provided on a front side of the armrest 22. An inside handle 24 for an operation of opening and closing the door is attached above the switch disposition portion 23. A door pocket 25 in which a small item can be accommodated is provided below the switch disposition portion 23 and a speaker grille 26 is attached ahead of the door pocket 25.

As illustrated in FIG. 3, each fitting hole 21 is a hole (opening) provided in the door trim base 20. The fitting holes 21 are provided in the door trim base 20 at intervals. In the embodiment of the disclosure and an illustrated example, five fitting holes 21 are provided.

Figure 2:
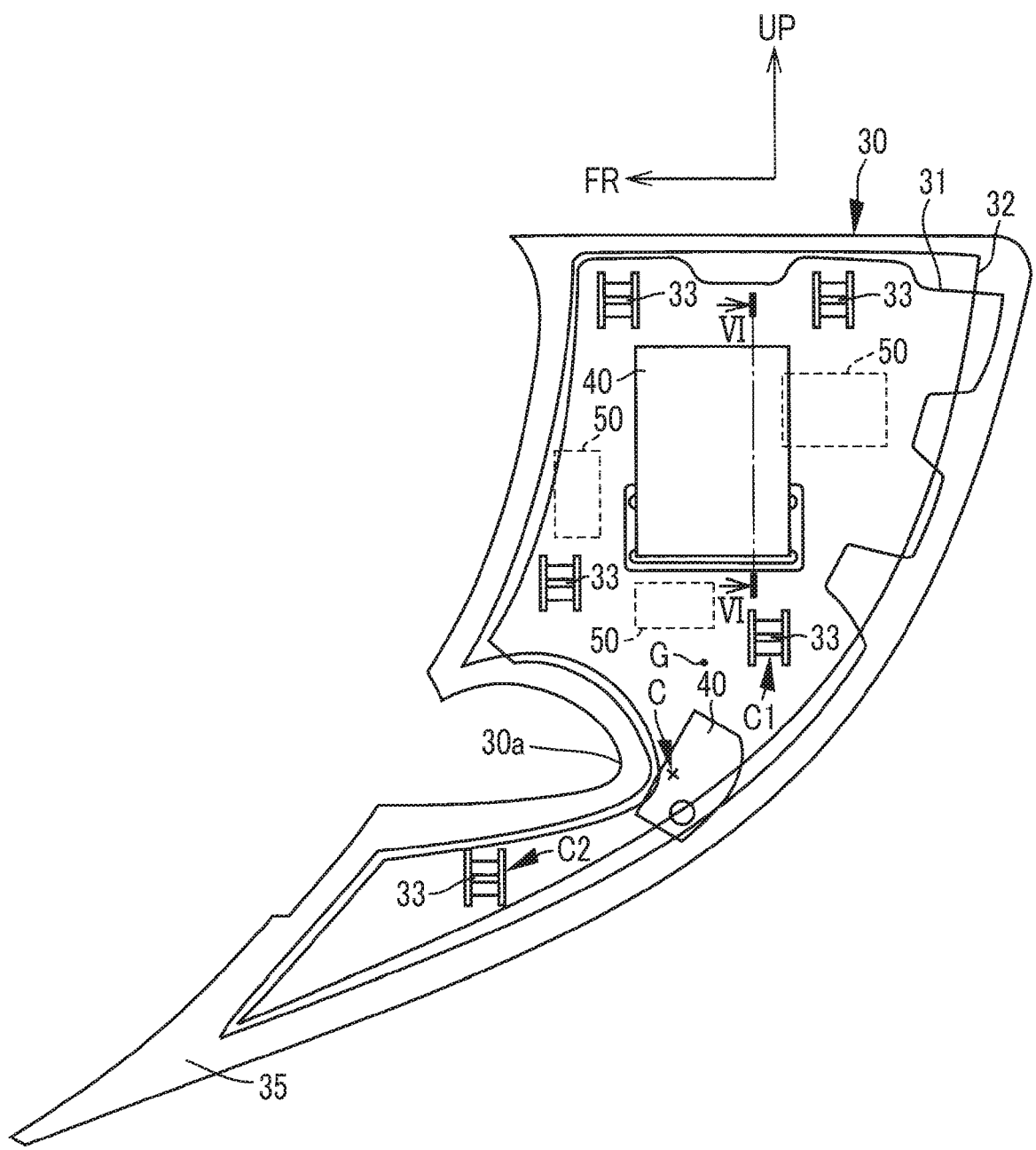
FIG. 2 is an enlarged see-through front view of an ornament and a strap of the door trim according to the embodiment of the disclosure.

The ornament 30 is provided to improve the design of the door trim 10. The ornament 30 is formed separately from the door trim base 20 and is attached to the door trim base 20 from the vehicle cabin side. As illustrated in FIG. 2, although the shape of the ornament 30 as seen in a front view (shape as seen from vehicle cabin side) is not particularly limited, the ornament 30 extends in the height direction and the length of the ornament 30 in the front-rear direction decreases toward a lower side with the ornament 30 curved frontward. In a case where the ornament 30 interferes with the inside handle 24 or the like, the ornament 30 may be provided with a recess portion 30a in order to avoid the interference between the ornament 30 and the inside handle 24 or the like.

As illustrated in FIG. 3, the ornament 30 is provided with an ornament base 31 and a high-brittleness portion 32 that is fixed to the ornament base 31 and of which at least a portion is more brittle than the ornament base 31.

The ornament base 31 is made of resin. The ornament base 31 may have a single-component configuration or a multi-component configuration. The ornament base 31 is provided with the fitting lugs 33 for attaching the ornament 30 to the door trim base 20 such that the fitting lugs 33 protrude toward the door trim base 20 side. The fitting lugs 33 may be integrally formed with the ornament base 31 and may be fixed and attached to the ornament base 31 while being formed separately from the ornament base 31. The number of the fitting lugs 33 is the same as the number of the fitting holes 21 of the door trim base 20 and the fitting lugs 33 are positioned such that the fitting lugs 33 can be fitted into the fitting holes 21. One fitting lug 33 is fitted into one fitting hole 21.

The fitting lug 33 is provided with a swelling portion 33a that can be elastically deformed and a seat portion 33b.

When the fitting lug 33 is fitted into the fitting hole 21, the fitting lug 33 is inserted into the fitting hole 21 with the swelling portion 33a elastically deformed by being pressed by an edge of the fitting hole 21. When the swelling portion 33a passes through the fitting hole 21, the swelling portion 33a recovers a state before the elastic deformation and the fitting of the fitting lug 33 into the fitting hole 21 is completed with a peripheral edge portion 21a of the fitting hole 21 interposed between the swelling portion 33a and the seat portion 33b.

A tip end surface of the swelling portion 33a in a direction in which the swelling portion 33a is inserted into the fitting hole 21 is an inclined surface 33a2 that is inclined in a direction toward a tip end of the swelling portion 33a and a direction toward a central axis 33a1 of the fitting lug 33. Accordingly, the fitting lug 33 can be inserted into the fitting hole 21 with the swelling portion 33a deformed. A surface of the swelling portion 33a that faces the seat portion 33b is an inclined surface 33a3 that is inclined in a direction away from the central axis 33a1 of the fitting lug 33 and in a direction away from the seat portion 33b. Accordingly, the fitting lug 33 fitted into the fitting hole 21 can be drawn out (removed) from the fitting hole 21.

The high-brittleness portion 32 is provided to improve the design of the ornament 30. At least a portion of the high-brittleness portion 32 is formed of highly brittle material that is more brittle than resin material of the ornament base 31. The highly brittle material is, for example, at least one of glass or stone (for example, marble). A film 34 is pasted onto a vehicle cabin side surface of the high-brittleness portion 32, which is a design surface, and the high-brittleness portion 32 is fixed and attached to the ornament base 31 through insert molding or bonding using a bonding agent or a double-sided tape in a state where an elastically deformable resin-made frame member 35 is continuously fitted onto an edge portion of the high-brittleness portion 32 over the entire periphery.

The high-brittleness portion 32 is provided on a vehicle cabin side surface of the ornament base 31, that is, a surface on a side opposite to a side on which the fitting lug 33 of the ornament base 31 is provided. The high-brittleness portion 32 has a thin plate-like shape and is provided on a vehicle cabin side surface of the ornament 30 in the form of a layer. The high-brittleness portion 32 may cover the entire vehicle cabin side surface of the ornament base 31 and may cover a portion of the vehicle cabin side surface of the ornament base 31. Regarding the high-brittleness portion 32, as seen from the vehicle cabin side (in front view), one high-brittleness portion 32 may be provided on one position and a plurality of high-brittleness portions 32 may be separately provided on a plurality of positions. The high-brittleness portion 32 is disposed to cover all of the fitting lugs 33 from the vehicle cabin side as seen in a direction from the vehicle cabin side to the ornament 30 (in front view).

As illustrated in FIG. 4, the door trim base 20 and the ornament 30 are connected to each other by the strap 40 that has an excess length when the ornament 30 is not separate from the door trim base 20 with the fitting lug 33 fitted into the fitting hole 21.

The number of straps 40 may be one. However, it is desirable that a plurality of straps 40 is provided because, even when one strap 40 is damaged, movement of the ornament 30 relative to the door trim base 20 can be suppressed by the remaining straps 40. FIG. 2 illustrates a case where two straps 40 are provided. In a case where a plurality of straps 40 is provided, it is desirable that the straps 40 are disposed on both sides of the centroid of the ornament 30 instead of being disposed on one side of the centroid of the ornament 30. This is for stabilizing the movement of the ornament 30 by using the straps 40 when the ornament 30 is separated from the door trim base 20. For example, in a case where the position of the centroid G of the ornament 30 is as illustrated in FIG. 2, one of the two straps 40 is disposed above the centroid G and the other of the two straps 40 is disposed below the centroid G. Each strap 40 may have a single-component configuration or a multi-component configuration.

The strap 40 may be referred to as a tether. The strap 40 is formed of flexible material, for example, fabric, resin material, or metal chain. In a case where the strap 40 is formed of resin material, the resin material is, for example, polyhexamethylene adipamide. However, resin material other than the polyhexamethylene adipamide may be used as long as the resin material is flexible and has a needed strength. In a case where the strap 40 is formed of fabric or resin material, the strap 40 has such a width that the strap 40 can endure a tension that is applied to the strap 40 when the ornament 30 is separated from the door trim base 20.

As illustrated in FIG. 4, a first end portion 41 as a first end portion of the strap 40 is attached to the door trim base 20 and a second end portion 42 as a second end portion of the strap 40 is attached to the ornament 30. The strap 40 is attached to the door trim base 20 and the ornament 30 at a position different from the position of a fitting point between the door trim base 20 and the ornament 30 (where fitting hole 21 and fitting lug 33 are provided). The second end portion 42 of the strap 40 is attached to the ornament base 31 of the ornament 30 instead of being attached to the high-brittleness portion 32 of the ornament 30.

Figure 6:
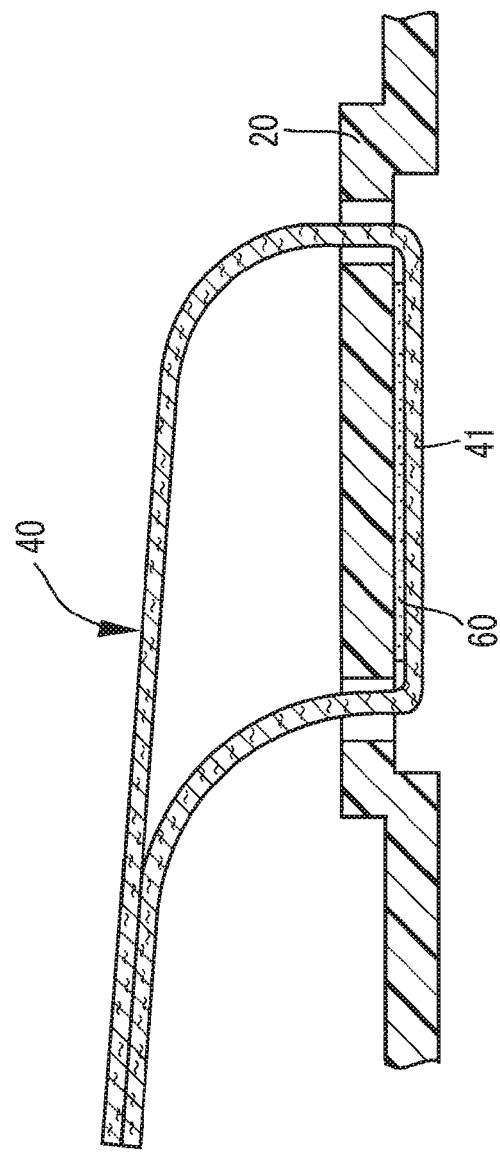
FIG. 6 is a sectional view taken along line VI-VI in FIG. 2.

The first end portion 41 of the strap 40 is attached to the door trim base 20 by being hooked onto a screw 27b that is screwed into a boss 27a. The boss 27a is provided on the door trim base 20 such that the boss 27a protrudes toward a side opposite to the vehicle cabin side. The second end portion 42 of the strap 40 is attached to the ornament 30 by being hooked onto a screw 36b that is screwed into a boss 36a. The boss 36a is provided on the ornament base 31 of the ornament 30 such that the boss 36a protrudes toward a side opposite to the vehicle cabin side. The strap 40 may be attached to the door trim base 20 or the ornament 30 by a double-sided tape, a bonding agent 60, or the like as illustrated in FIG. 6.

As illustrated in FIG. 4, an excess length portion 43 of the strap 40 is between the first end portion 41 and the second end portion 42. When the fitting lug 33 is fitted into the fitting hole 21, the excess length portion 43 is in a state of being folded into a bellows shape or a roll shape and the excess length portion 43 is sewed with a string 43a or the like that is relatively easily removed when a tension is applied thereto. Accordingly, the excess length portion 43 is restrained from coining into contact with a nearby member or being hooked onto a nearby member when the fitting lug 33 is fitted into the fitting hole 21 and no tension is applied to the strap 40. The length of the excess length portion 43 of the strap 40 is long to such an extent that the fitting lug 33 can be reliably removed from the fitting hole 21 and the ornament 30 can be reliably separated from the door trim base 20. The length of the excess length portion 43 is longer than the length of the swelling portion 33a of the fitting lug 33. For example, the length of the excess length portion 43 is equal to or greater than 10 mm.

At the time of side collision of the vehicle, a shock load toward the vehicle cabin side is input to the door trim 10 via the metal door panel (not shown). Due to the input of the shock load, a concentrated load F acts on a position between the fitting points between the ornament 30 and the door trim base 20 (where fitting hole 21 and fitting lug 33 are provided). According to a deflection formula, deflection X of the high-brittleness portion 32 caused by the load F is $X=(F \cdot L^3)/48 \cdot E \cdot I$, where X: deflection, E: elastic coefficient, L: distance between fitting point (fixation point) and load point, and I: geometrical moment of inertia.

For example, description will be made on an assumption that, in a case where the deflection X is 15 mm, both of the high-brittleness portion 32 and the film 34 may be damaged at the most brittle portion of the high-brittleness portion 32, that is, an intermediate portion C (refer to FIG. 2) between fitting points C1, C2 where a distance between the fitting points becomes maximum and the width of the high-brittleness portion 32 is relatively small. According to calculation based on the above formula, a load of F=452 N is applied between the fitting points C1, C2 in a case where X=15 mm. When a load applied between the fitting points C1, C2 is caused to become smaller than 452 N in order that Xmax<15 mm is satisfied, both of the high-brittleness portion 32 and the film 34 can be restrained from being damaged at an area between the fitting points C1, C2 including the intermediate portion C, which is the most brittle portion. As a result, since a load applied between the fitting points becomes lower than 452 N, both of the high-brittleness portion 32 and the film 34 can be restrained from being damaged over the entire portion thereof. Since the number of fitting points provided in the embodiment of the disclosure and the illustrated example is five, a load applied to one fitting lug 33 is 452/5=90.4. When a threshold value of a holding load (extracting load) of one fitting lug 33 is set to 80 N in consideration of a safety factor, it is sufficient to adjust a separation load such that the ornament 30 is separated from the door trim base 20 when a load of 400 N or more is applied since 80×5=400. Accordingly, at the time of side collision of the vehicle or the like, the ornament 30 can be separated from the door trim base 20 before both of the high-brittleness portion 32 and the film 34 of the ornament 30 are damaged.

Adjustment of a separation load of the ornament 30 from the door trim base 20 may be, performed by adjusting a pull-off load of the fitting lug 33 from the fitting hole 21 by a change in number of fitting points between the fitting hole 21 and the fitting lug 33, a change in inclination angle of the inclined surface 33a3 of the fitting lug 33, a change in engagement margin between the fitting lug 33 and the peripheral edge portion 21a of the fitting hole 21 that is made by changing the size of the swelling portion 33a of the fitting lug 33, or the like. However, it is relatively difficult to adjust the separation load by using the fitting lug 33 solely. Therefore, when a load smaller than that at the time of side collision is applied to the ornament 30 like when a door is strongly closed in a normal state without side collision, the ornament 30 may be separated from the door trim base 20 with the fitting lug 33 falling off the fitting hole 21. Therefore, in the embodiment of the disclosure, it is desirable that a hook-and-loop fastener 50 is provided so that the ornament 30 is restrained from falling off the door trim base 20 when a load smaller than that at the time of side collision is applied to the ornament 30.

The hook-and-loop fastener 50 is a component of the door trim 10. As illustrated in FIG. 4, the hook-and-loop fastener 50 is provided with a first hook-and-loop fastener portion 51 that is provided on the door trim base 20 and a second hook-and-loop fastener portion 52 that is provided on the ornament 30 and is bonded to the first hook-and-loop fastener portion 51.

The first hook-and-loop fastener portion 51 is provided to be fixed to a portion of the vehicle cabin side surface of the door trim base 20 that faces the ornament 30 by a double-sided tape, a bonding agent, or the like. The second hook-and-loop fastener portion 52 is provided to be fixed to a portion of a surface of the ornament 30 that faces the first hook-and-loop fastener portion 51 by a double-sided tape, a bonding agent, or the like, the surface of the ornament 30 being on a side opposite to the vehicle cabin side. The number and position of the hook-and-loop fasteners 50 is set in consideration of the mass, the position of a centroid, or the like of the high-brittleness portion 32 of the ornament 30.

Here, the operation and effect of the embodiment of the disclosure will be described.

(i) In Normal State without Side Collision

As illustrated in FIG. 3, the fitting lug 33 is fitted into the fitting hole 21. As illustrated in FIG. 4, the excess length portion 43 of the strap 40 is in, a state of being folded up and the first hook-and-loop fastener portion 51 and the second hook-and-loop fastener portion 52 are in a state of being bonded to each other.

(ii) When Door is Closed in Normal State without Side Collision

When the door is closed, including when the door is strongly closed, a relatively small load (inertial force (load of less than 400 N)) acts on the ornament 30. At this time, a bonded state between the first hook-and-loop fastener portion 51 and the second hook-and-loop fastener portion 52 is maintained and a fitting state between the fitting lug 33 and the fitting hole 21 is maintained. Therefore, a state where the ornament 30 is attached to the door trim base 20 is maintained.

(iii) At Time of Side Collision of Vehicle

Figure 5:
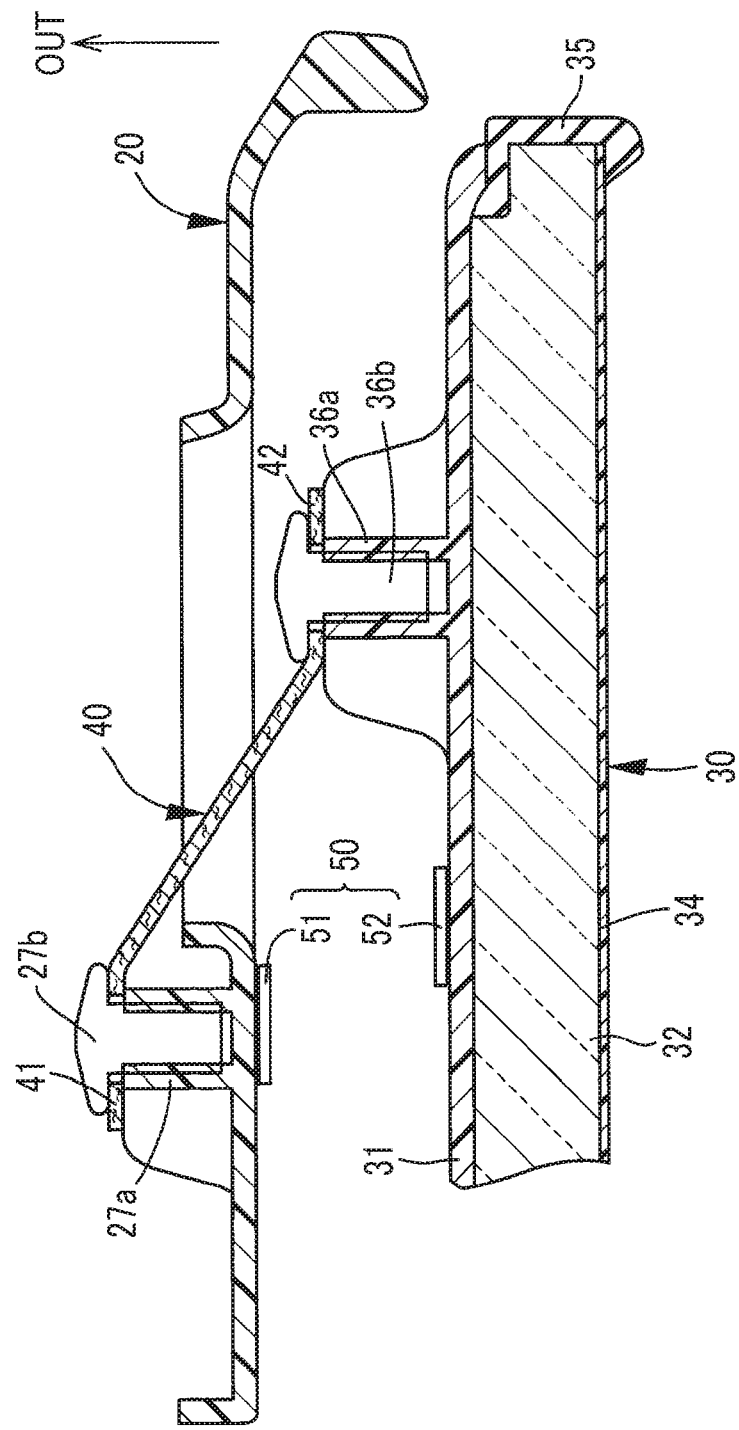
FIG. 5 is a partially enlarged sectional view illustrating the strap in a state where the ornament is separated from a door trim base with the fitting lug falling out from the fitting hole of the door trim according to the embodiment of the disclosure and the vicinity of the strap.

At the time of side collision, a shock load toward the vehicle cabin side is input to the door trim 10 via the metal door panel (not shown). Due to the input of the shock load, a relatively large load (load of 400 N or more) acts on the ornament 30. Therefore, as illustrated in FIG. 5, the first hook-and-loop fastener portion 51 and the second hook-and-loop fastener portion 52 bonded to each other are separated from each other, the fitting lug 33 falls off the fitting hole 21, and the ornament 30 is separated from the door trim base 20. At this time, since the strap 40 is provided, the ornament 30 can move from the door trim base 20 until there is no remaining excess length of the strap 40.

(A) According to the embodiment of the disclosure, since the door trim. base 20 and the ornament 30 are connected to each other by the strap 40 having the excess length, the ornament 30 cannot move relative to the door trim base 20 by a distance exceeding a distance corresponding to the excess length of the strap 40 even when the fitting lug 33 falls off the fitting hole 21 at the time of side collision or the like of the vehicle. Therefore, the high-brittleness portion 32 of the ornament 30 can be restrained from being damaged due to falling of the ornament 30.

(B) It is also conceivable to cause the fitting lug 33 to be firmly fitted into the fitting hole 21 such that the fitting lug 33 does not fall off the fitting hole 21 or to firmly attach the ornament 30 to the door trim base 20 by fastening the ornament 30 by a screw (not shown) instead of the fitting lug. However, in this case, there is a possibility that the ornament 30 does not fall off the door trim base 20 even at the time of side collision and there is a possibility that a load at the time of side collision is applied to the ornament 30 and the ornament 30 is damaged due to the load at the time of the side collision even when the ornament 30 does not fall. However, according to the embodiment of the disclosure, since the fitting lug 33 falls out from the fitting hole 21 at the time of side collision, the ornament 30 is restrained from being damaged with a load at the time of side collision applied to the ornament 30.

(C) The door trim base 20 is provided with the first hook-and-loop fastener portion 51 and the ornament 30 is provided with the second hook-and-loop fastener portion 52 bonded to the first hook-and-loop fastener portion 51. Therefore, vibration of the ornament 30 that is generated when a load smaller than that at the time of side collision of the vehicle is applied to the ornament 30 like when the door is normally closed (including when door is strongly closed) can be absorbed by the first hook-and-loop fastener portion 51 and the second hook-and-loop fastener portion 52. Therefore, even in a case where the fitting lug 33 is configured to fall off the fitting hole 21, the ornament 30 can be restrained from being falling off the door trim base 20.

(D) Since the high-brittleness portion 32 is formed of at least one of glass or stone, it is possible to achieve a classy door trim design.

(E) The strap 40 is attached to the ornament base 31 of the ornament 30. Therefore, unlike a case where the strap 40 is attached to the high-brittleness portion 32 of the ornament 30, the tension of the strap 40 can be restrained from being applied to the high-brittleness portion 32 when the ornament 30 is separated from the door trim base 20 and the high-brittleness portion 32 can be restrained front being damaged.

What is claimed is:

1. A door trim comprising:
a door trim base that has a fitting hole; and
an ornament that has a fitting lug, the ornament being configured to be attached to the door trim base with the fitting lug fitted into the fitting hole, wherein:
the ornament includes an ornament base in which the fitting lug is provided and a high-brittleness portion that is fixed to the ornament base and of which at least a portion is more brittle than the ornament base; and
the door trim base and the ornament are connected to each other by a strap that has an excess length when the fitting lug is fitted into the fitting hole.

2. The door trim according to claim 1, wherein:
the door trim base is provided with a first hook-and-loop fastener portion; and
the ornament is provided with a second hook-and-loop fastener portion to be bonded to the first hook-and-loop fastener portion.

3. The door trim according to claim 1, wherein the at least portion of the high-brittleness portion is formed of at least one of glass or stone.

4. The door trim according to claim 1, wherein the strap is attached to the ornament base of the ornament.

5. The door trim according to claim 1, wherein the strap has the excess length between a first end portion of the strap and a second end portion of the strap, the first end portion being a part where the strap is attached to the door trim base, the second end portion being a part where the strap is attached to the ornament.

6. The door trim according to claim 1, wherein the strap is formed of a flexible material.

7. The door trim according to claim 1, wherein the strap connects the door trim base to the ornament when the fitting lug is spaced apart from the fitting hole.

* * * * *

UNITED STATES PATENT AND TRADEMARK OFFICE
CERTIFICATE OF CORRECTION

PATENT NO. : 10,766,432 B2
APPLICATION NO. : 16/043473
DATED : September 8, 2020
INVENTOR(S) : Masahiro Fujita and Manabu Ohtsuka Page 1 of 1

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Nisshin" and insert --Nisshin-shi Aichi-ken--, therefor.

In the Specification

In Column 5, Line(s) 54, delete "coining" and insert --coming--, therefor.

In Column 6, Line(s) 44, after "may be", delete ",".

In Column 7, Line(s) 21, after "is in", delete ",".

In Column 7, Line(s) 50, after "trim", delete ".".

In Column 8, Line(s) 30, delete "front" and insert --from--, therefor.

Signed and Sealed this
Twelfth Day of January, 2021

Andrei Iancu
*Director of the United States Patent and Trademark Office*